United States Patent
Kakishima et al.

(10) Patent No.: US 8,848,647 B2
(45) Date of Patent: *Sep. 30, 2014

(54) DATA TRANSMITTING METHOD, BASE STATION APPARATUS AND MOBILE STATION APPARATUS

(75) Inventors: Yuichi Kakishima, Tokyo (JP); Hidekazu Taoka, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 60 days.

This patent is subject to a terminal disclaimer.

(21) Appl. No.: 13/643,473

(22) PCT Filed: Apr. 21, 2011

(86) PCT No.: PCT/JP2011/059784
§ 371 (c)(1),
(2), (4) Date: Nov. 20, 2012

(87) PCT Pub. No.: WO2011/136113
PCT Pub. Date: Nov. 3, 2011

(65) Prior Publication Data
US 2013/0058279 A1 Mar. 7, 2013

(30) Foreign Application Priority Data
Apr. 30, 2010 (JP) .................. 2010-105399

(51) Int. Cl.
*H04W 4/00* (2009.01)
*H04H 20/67* (2008.01)
(Continued)

(52) U.S. Cl.
CPC .... *H04B 7/0417* (2013.01); *H04L 2025/03777* (2013.01); *H04L 5/0051* (2013.01);
(Continued)

(58) Field of Classification Search
None
See application file for complete search history.

(56) References Cited

U.S. PATENT DOCUMENTS

2009/0213955 A1   8/2009   Higuchi et al.
2010/0056217 A1*  3/2010   Montojo et al. ........... 455/562.1
(Continued)

FOREIGN PATENT DOCUMENTS

JP    2007-28569 A    2/2007

OTHER PUBLICATIONS

International Search Report w/translation issued in PCT/JP2011/059784 mailed May 31, 2011 (4 pages).
(Continued)

*Primary Examiner* — John Blanton
*Assistant Examiner* — Christopher Crutchfield
(74) *Attorney, Agent, or Firm* — Osha Liang LLP (57) ABSTRACT

The data rate in MIMO transmission is increased to a maximum even when a number of transmitting antennas of a base station apparatus is different from the number of transmitting antennas of the base station apparatus supported by a mobile station apparatus. The base station apparatus (eNodeB) reports the number of transmitting antennas provided for the base station apparatus to the mobile station apparatus UE (ST11). The mobile station apparatus UE compares the reported number of transmitting antennas with a maximum number of supported antennas of the base station apparatus (eNodeB) supported by the mobile station apparatus UE, selects the smaller number of antennas as a number of virtual antennas (ST12), and reports the number of virtual antennas to the base station apparatus (eNodeB) (ST13). The base station apparatus (eNodeB) transmits a data channel signal in accordance with the reported number of virtual antennas (ST15).

10 Claims, 7 Drawing Sheets (51) Int. Cl.
*H04B 7/04* (2006.01)
*H04B 7/02* (2006.01)
*H04L 25/03* (2006.01)
*H04L 5/00* (2006.01)
*H04B 7/06* (2006.01)

(52) U.S. Cl.
CPC . *H04L 2025/03414* (2013.01); *H04L 25/03343* (2013.01); *H04B 7/04* (2013.01); *H04B 7/0665* (2013.01); *H04B 7/024* (2013.01); *H04B 7/0452* (2013.01); *H04B 7/0639* (2013.01); *H04L 2025/03426* (2013.01); *H04L 5/0057* (2013.01); *H04B 7/0691* (2013.01); *H04B 7/063* (2013.01); *H04L 5/0023* (2013.01)
USPC .......................................... 370/329; 370/339

(56) References Cited

U.S. PATENT DOCUMENTS

| | | | |
|---|---|---|---|
| 2010/0227569 A1* | 9/2010 | Bala et al. ........................ | 455/73 |
| 2011/0026828 A1* | 2/2011 | Balasubramanian et al. | 382/187 |
| 2011/0268050 A1* | 11/2011 | Farajidana et al. ........... | 370/329 |
| 2011/0274102 A1* | 11/2011 | Kim et al. .................... | 370/350 |

OTHER PUBLICATIONS

3GPP TR 25.913 V8.0.0; "3rd Generation Partnership Project; Technical Specification Group Radio Access Network; Requirements for Evolved UTRA (E-UTRA) and Evolved UTRAN (E-UTRAN) (Release 8)"; Dec. 2008 (18 pages).

* cited by examiner

# DATA TRANSMITTING METHOD, BASE STATION APPARATUS AND MOBILE STATION APPARATUS

TECHNICAL FIELD

The present invention relates to a data transmitting method, a base station apparatus and a mobile station apparatus, and more particularly, to a data transmitting method, a base station apparatus and a mobile station apparatus supporting multiantenna transmission.

BACKGROUND ART

In UMTS (Universal Mobile Telecommunications System) networks, attempts are made to adopt HSDPA (High Speed Downlink Packet Access) or HSUPA (High Speed Uplink Packet Access) for the purpose of improving frequency utilization efficiency and improving a data rate to thereby make the most of features of W-CDMA (Wideband Code Division Multiple Access)-based systems. Regarding this UMTS network, Long Term Evolution (LTE) is being studied aiming at a higher data rate and lower delay or the like.

Third-generation systems can generally realize a transmission rate of a maximum of the order of 2 Mbps on a downlink using a fixed band of 5 MHz. On the other hand, LTE-based systems can realize a transmission rate of a maximum of the order of 300 Mbps on a downlink and the order of 75 Mbps on an uplink using a variable band of 1.4 MHz to 20 MHz. Furthermore, in the UMTS networks, a system as the successor to LTE is also being studied for the purpose of achieving a wider band and higher rate (e.g., LTE Advanced (LTE-A)). For example, in LTE-A, 20 MHz which is the maximum system band of the LTE specification is scheduled to be extended to the order of 100 MHz. Furthermore, In LTE-A, the maximum number (four) of transmission antennas in the LTE specification is scheduled to be increased to eight.

Furthermore, in the LTE-based system, a MIMO (Multi Input Multi Output) system is being proposed as a radio communication technique for transmitting/receiving data using a plurality of antennas and improving a data rate (frequency utilization efficiency) (e.g., see Non-Patent Literature 1). In the MIMO system, a transmitter/receiver is provided with a plurality of transmitting/receiving antennas and different transmission information sequences are simultaneously transmitted from different transmitting antennas. On the other hand, the receiver side separates and detects information sequences which are simultaneously transmitted taking advantage of the fact that different fading fluctuations are generated between the transmitting/receiving antennas, and can thereby increase the data rate (frequency utilization efficiency).

CITATION LIST

Non-Patent Literature

Non-Patent Literature 1: 3GPP TR 25.913 "Requirements for Evolved UTRA and Evolved UTRAN"

SUMMARY OF INVENTION

Technical Problem

In MIMO transmission carried out on a downlink, a mobile station apparatus UE, which is generally a receiver, can appropriately comprehend the number of antennas of a base station apparatus eNodeB, which is a transmitter, (hereinafter referred to as "the number of transmitting antennas" as appropriate) and when the mobile station apparatus UE supports data communication in accordance with the number of transmitting antennas, it is possible to increase the data rate to a maximum (frequency utilization efficiency).

On the contrary, when the mobile station apparatus UE cannot appropriately comprehend the number of transmitting antennas, subsequent data communication may be impossible. Furthermore, even when the number of transmitting antennas can be appropriately comprehended, if the mobile station apparatus UE does not support data communication with the number of transmitting antennas, it may be difficult to increase the data rate appropriate to the number of antennas provided for the mobile station apparatus UE. From the standpoint of increasing the data rate, even in such a case, it is preferable to perform data communication using a number of transmitting antennas that allows the data rate to be increased to a maximum based on the number of transmitting antennas and the number of transmitting antennas supported by the mobile station apparatus UE.

The present invention has been implemented in view of the above-described circumstances, and it is an object of the present invention to provide a data transmitting method, a base station apparatus and a mobile station apparatus capable of increasing a data rate to a maximum in MIMO transmission even when the number of transmitting antennas of the base station apparatus is different from the number of transmitting antennas of the base station apparatus supported by the mobile station apparatus.

Solution to Problem

A data transmitting method according to the present invention includes a step of reporting the number of transmitting antennas of a base station apparatus to a mobile station apparatus, a step of the mobile station apparatus comparing the number of transmitting antennas with a maximum number of supported antennas of the base station apparatus supported by the mobile station apparatus and selecting the smaller number of antennas as a number of virtual antennas, a step of reporting the number of virtual antennas to the base station apparatus, and a step of transmitting a data channel signal from the base station apparatus in accordance with the number of virtual antennas.

According to this method, of the number of transmitting antennas of the base station apparatus and the maximum number of supported antennas of the base station apparatus supported by the mobile station apparatus, the smaller number of antennas is selected as a number of virtual antennas and a data channel signal is transmitted in accordance with this number of virtual antennas. In this way, it is possible to perform data transmission according to the number of virtual antennas with which the data rate can be increased most effectively between the number of transmitting antennas of the base station apparatus and the number of supported antennas of the mobile station apparatus, and thereby increase the data rate to a maximum in MIMO transmission even when the number of transmitting antennas of the base station apparatus is different from the number of antennas of the base station apparatus supported by the mobile station apparatus. Furthermore, since the number of transmitting antennas of the base station apparatus is reported and the number of virtual antennas is selected based on this number of transmitting antennas, it is possible to avoid such a situation in which it is not possible to appropriately comprehend the number of transmitting antennas of the base station apparatus, making subsequent data communication impossible.

A base station apparatus according to the present invention includes antenna information transmitting section configured to transmit the number of transmitting antennas provided for the base station apparatus to a mobile station apparatus, receiving section configured to receive, from the mobile station apparatus, a number of virtual antennas made up of whichever is the smaller of the number of transmitting antennas and a maximum number of supported antennas of the base station apparatus supported by the mobile station apparatus, and data transmitting section configured to transmit a data channel signal to the mobile station apparatus in accordance with the number of virtual antennas.

According to this configuration, a data channel signal is transmitted in accordance with the number of virtual antennas made up of whichever is the smaller of the number of transmitting antennas of the base station apparatus and the maximum number of supported antennas of the base station apparatus supported by the mobile station apparatus. In this way, it is possible to perform data transmission with the number of virtual antennas that allows the data rate to be increased most effectively between the number of transmitting antennas of the base station apparatus and the number of supported antennas of the mobile station apparatus, and thereby increase the data rate to a maximum in MIMO transmission even when the number of transmitting antennas of the base station apparatus is different from the number of antennas of the base station apparatus supported by the mobile station apparatus.

A mobile station apparatus according to the present invention includes receiving section configured to receive the number of transmitting antennas of a base station apparatus, selecting section configured to compare the number of transmitting antennas with a maximum number of supported antennas of the base station apparatus supported by the mobile station apparatus and selecting the smaller number of antennas as a number of virtual antennas, and antenna information transmitting section configured to transmit the number of virtual antennas to the base station apparatus.

According to this configuration, whichever is the smaller of the number of transmitting antennas of the base station apparatus and the maximum number of supported antennas of the base station apparatus supported by the mobile station apparatus is selected as a number of virtual antennas and transmitted to the base station apparatus, and it is thereby possible to report the number of virtual antennas that allows the data rate to be increased most effectively between the number of transmitting antennas of the base station apparatus and the number of supported antennas of the mobile station apparatus to the base station apparatus. Thus, the base station apparatus transmits a data channel signal in accordance with this number of virtual antennas, and it is thereby possible to perform data transmission with the number of virtual antennas that allows the data rate to be increased most effectively between the number of transmitting antennas of the base station apparatus and the number of supported antennas of the mobile station apparatus, and thereby increase the data rate to a maximum in MIMO transmission even when the number of transmitting antennas of the base station apparatus is different from the number of antennas of the base station apparatus supported by the mobile station apparatus.

Technical Advantage of the Invention

According to the present invention, whichever is the smaller of the number of transmitting antennas of the base station apparatus and the maximum number of supported antennas of the base station apparatus supported by the mobile station apparatus is selected as a number of virtual antennas and a data channel signal is transmitted in accordance with this number of virtual antennas. Thus, it is possible to perform data transmission with the number of virtual antennas that allows the data rate to be increased most effectively between the number of transmitting antennas of the base station apparatus and the number of supported antennas of the mobile station apparatus, and thereby increase the data rate to a maximum in MIMO transmission even when the number of transmitting antennas of the base station apparatus is different from the number of antennas of the base station apparatus supported by the mobile station apparatus.

DESCRIPTION OF EMBODIMENTS

Figure 1:
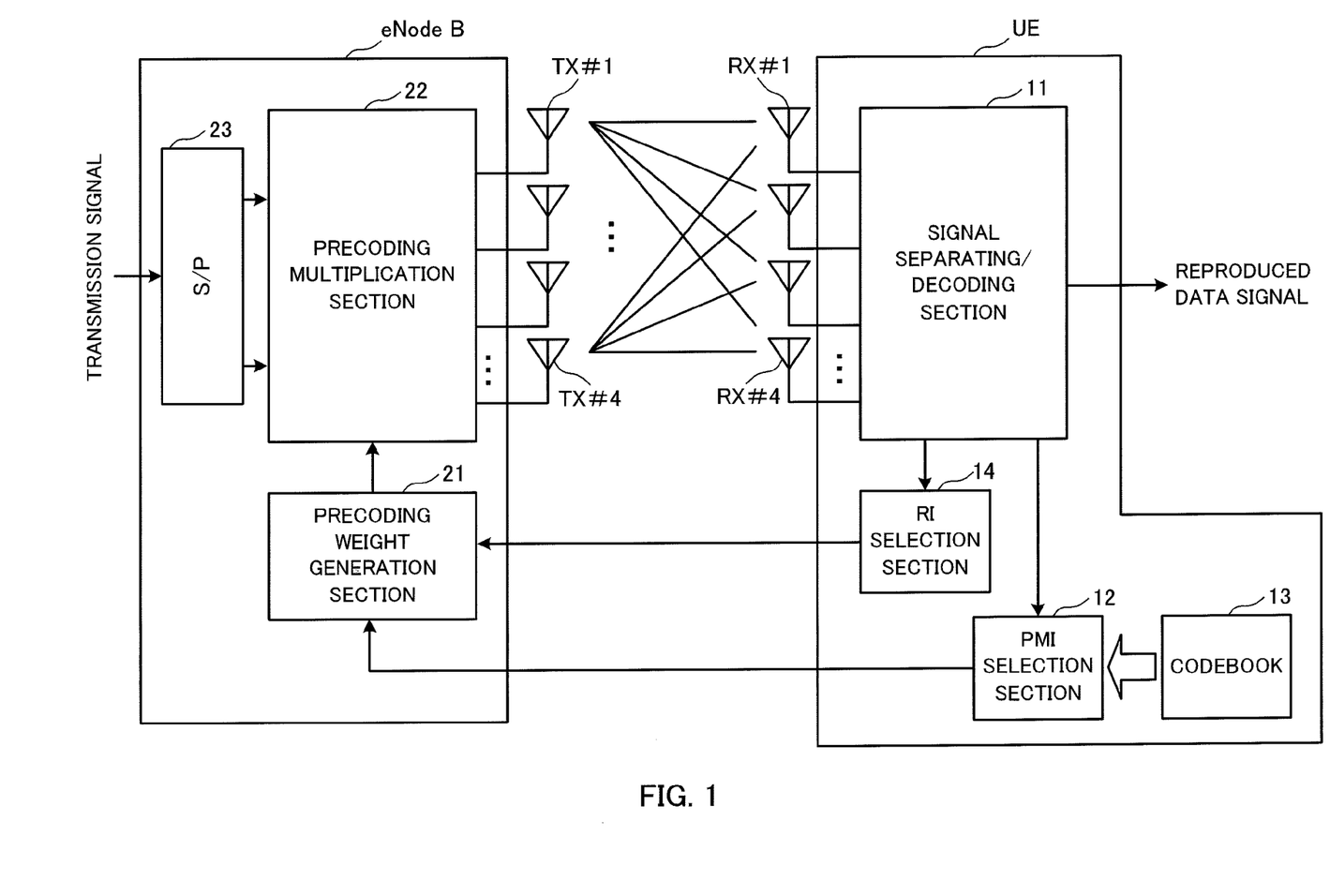
FIG. 1 is a conceptual diagram of a MIMO system to which a data transmitting method according to the present invention is applied.

Hereinafter, embodiments of the present invention will be described in detail with reference to the accompanying drawings. First, downlink MIMO transmission carried out in an LTE system will be described using a MIMO system shown in FIG. 1 as a premise. FIG. 1 is a conceptual diagram of the MIMO system to which a data transmitting method according to the present invention is applied. In the MIMO system shown in FIG. 1, a case is shown where a base station apparatus eNodeB and a user terminal UE are each provided with four antennas.

In downlink MIMO transmission of the MIMO system shown in FIG. 1, the mobile station apparatus UE measures a channel variation amount using a received signal from each antenna, and based on the measured channel variation amount, selects a PMI and RI corresponding to the phase/amplitude control amounts (precoding weight) that maximize throughput (or reception SINR) of combined transmission data from the respective transmission antennas of the base station apparatus eNode B. The selected PMI and RI are fed back to the base station apparatus eNodeB over an uplink together with a CQI (Channel Quality Indicator) indicating channel quality information. The base station apparatus eNodeB performs precoding on the transmission data based on the PMI and RI fed back from the mobile station apparatus UE and then transmits information from each antenna.

In the mobile station apparatus UE shown in FIG. 1, a signal separating/decoding section 11 performs separating and decoding on a control channel signal and a data channel signal included in the received signal received via receiving antennas RX#1 to RX#4. The signal separating/decoding section 11 performs decoding processing and thereby reproduces a data channel signal for the mobile station apparatus UE. A PMI selection section 12 selects a PMI in accordance with a channel condition estimated by a channel estimation section (not shown). In this case, the PMI selection section 12 selects an optimum PMI from a codebook 13 which defines N known precoding weights defined per rank for both the mobile station apparatus UE and the base station apparatus eNodeB and PMIs associated with this precoding matrix. An RI selection section 14 selects an RI in accordance with a channel condition estimated by the channel estimation section. These PMI and RI are transmitted to the base station apparatus eNodeB together with a CQI as feedback information.

On the other hand, in the base station apparatus eNodeB shown in FIG. 1, a precoding weight generation section 21 generates a precoding weight based on the PMI and RI fed back from the mobile station apparatus UE. A precoding multiplication section 22 multiplies a transmission signal which is converted to a parallel signal by a serial/parallel conversion section (S/P) 23 by a precoding weight and thereby controls (shifts) a phase/amplitude for each of transmitting antennas TX#1 to TX#4. This causes the phase/amplitude-shifted transmission data to be transmitted from the four transmitting antennas TX#1 to TX#4.

The LTE system supports 1, 2 and 4 antennas as the number of transmitting antennas of the base station apparatus eNodeB. In the LTE system, the number of transmitting antennas of the base station apparatus eNodeB is set to be equal to the number of antenna ports of an RS (CRS: Cell Specific Reference Signal) common to cell in principle. Transmission diversity of a PBCH (Physical Broadcast Channel) differs depending on the number of transmitting antennas (1, 2 and 4 antennas). For example, space frequency block coding (SFBC) is used for 2 antennas and a combination of SFBC and frequency switching transmission diversity (FTSD: Frequency Time Switching Transmit Diversity) is used in the case of 4 antennas. Using such a feature, the mobile station apparatus UE performs blind detection on MIB (Master Information Block) information in the PBCH and comprehends the number of transmitting antennas when data is accurately demodulated as the number of transmitting antennas of the base station apparatus eNodeB. That is, in the LTE system, it is possible to indirectly comprehend the number of transmitting antennas of the base station apparatus eNodeB through the blind detection of the MIB information in the PBCH from the base station apparatus eNodeB.

On the other hand, the LTE-A system is scheduled to support 8 antennas in addition to 1, 2 and 4 antennas as the number of transmitting antennas of the base station apparatus eNodeB. However, the LTE-A system prepares CRS antenna ports corresponding to only 4 antennas. Furthermore, for transmission diversity of the PBCH, transmission diversity based on the number of antenna ports of CRS (e.g., SFBC or a combination of SFBC and FTSD) is used as in the case of the LTE system in principle. When the number of transmitting antennas of the base station apparatus eNodeB is 8, any one of these transmission diversity methods is used as appropriate. For this reason, when the base station apparatus eNodeB has 8 antennas, there may be a situation in which the number of transmitting antennas of the base station apparatus eNodeB obtained through blind detection of the MIB information in the PBCH is different from the number of transmitting antennas of the actual base station apparatus eNode in the mobile station apparatus UE. In this way, when the mobile station apparatus UE cannot appropriately comprehend the number of transmitting antennas of the base station apparatus eNodeB, subsequent data communication may be impossible.

Furthermore, even when the number of transmitting antennas of the base station apparatus eNodeB can be appropriately comprehended, if the mobile station apparatus UE does not support data communication with the number of transmitting antennas, it may be difficult to increase the data rate appropriate to the number of transmitting antennas provided for the mobile station apparatus UE. Such a situation may occur when, for example, a base station apparatus eNodeB of an LTE-A specification carries out data communication with a mobile station apparatus UE of an LTE specification. From the standpoint of increasing the data rate, it is preferable to perform data communication using a number of transmitting antennas that can most increase the data rate based on the number of transmitting antennas of the base station apparatus and the maximum number of transmitting antennas of the base station apparatus eNodeB supported by the mobile station apparatus UE. The present inventor came up with the present invention by noticing that failure to appropriately comprehend the number of transmitting antennas of the base station apparatus eNodeB may make subsequent data communication impossible or that when the number of transmitting antennas of the base station apparatus eNodeB is different from the number of transmitting antennas of the base station apparatus eNodeB supported by the mobile station apparatus UE, it may be difficult to increase the data rate in MIMO transmission.

According to the data transmitting method of the present invention, the number of transmitting antennas of the base station apparatus eNodeB is reported to the mobile station apparatus UE first. The mobile station apparatus UE compares the number of transmitting antennas reported from the base station apparatus eNodeB with the maximum number of supported antennas of the number of transmitting antennas of the base station apparatus eNodeB supported by the mobile station apparatus UE (hereinafter referred to as "the number of supported antennas"). Of these numbers of antennas, the smaller number of antennas is selected as a number of virtual antennas and this number of virtual antennas is reported to the base station apparatus eNodeB. Next, the base station apparatus eNodeB transmits a data channel signal in accordance with the number of virtual antennas reported from the mobile station apparatus UE using a MIMO transmission technique.

According to the data transmitting method of the present invention, whichever is the smaller of the number of transmitting antennas of the base station apparatus eNodeB and the maximum number of supported antennas of the base station apparatus eNodeB supported by the mobile station apparatus UE is selected as a number of virtual antennas and a data channel signal is transmitted according to this number of virtual antennas. It is thereby possible to perform data transmission with the number of virtual antennas that allows the data rate to be increased most effectively between the number of transmitting antennas of the base station apparatus eNodeB and the number of supported antennas of the mobile station apparatus UE, and thus increase the data rate to a maximum in MIMO transmission even when the number of transmitting antennas of the base station apparatus eNodeB is different from the number of antennas of the base station apparatus eNodeB supported by the mobile station apparatus UE. Furthermore, the number of transmitting antennas of the base station apparatus eNodeB is reported and the number of virtual antennas is selected based on this number of transmitting antennas, and it is thereby possible to avoid such a situation in which it is not possible to appropriately comprehend the number of transmitting antennas of the base station apparatus eNodeB, making subsequent data communication impossible.

Hereinafter, aspects of the data transmitting method according to the present invention will be described. The data transmitting method according to the present invention is executed at start-up of the mobile station apparatus UE. The data transmitting methods according to first to third aspects of the present invention, which will be described below, differ from each other in information to be multiplexed to report the number of transmitting antennas of the base station apparatus eNodeB to the mobile station apparatus UE. In the data transmitting method according to the first aspect, the number of transmitting antennas of the base station apparatus eNodeB is multiplexed with the MIB information and transmitted. In the data transmitting method according to the second aspect, the number of transmitting antennas of the base station apparatus eNodeB is multiplexed the SIB (System Information Block) information and transmitted. In the data transmitting method according to the third aspect, the number of transmitting antennas of the base station apparatus eNodeB is multiplexed with RRC signaling information and transmitted.

Figure 2:
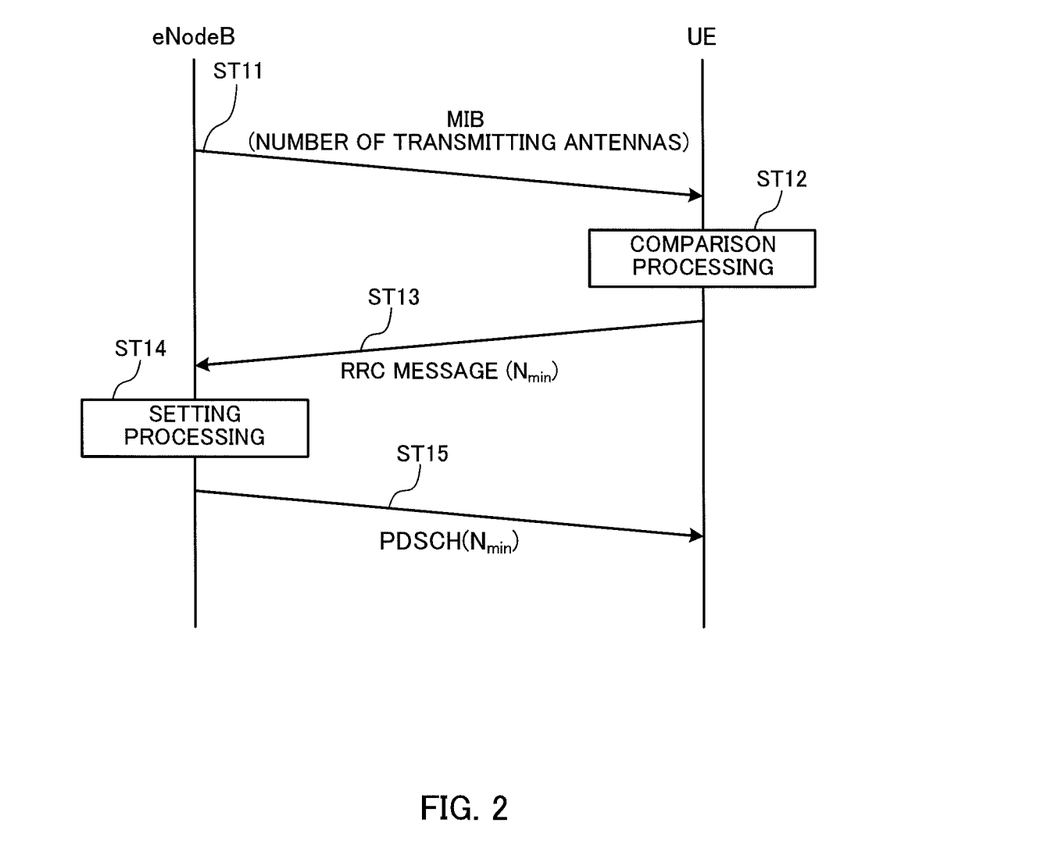
FIG. 2 is a sequence diagram illustrating the data transmitting method according to a first aspect of the present invention.

FIG. 2 is a sequence diagram to illustrate the data transmitting method according to the first aspect of the present invention. As shown in FIG. 2, in the data transmitting method according to the first aspect, the number of transmitting antennas of the base station apparatus eNodeB is multiplexed with MIB information from the base station apparatus eNodeB and transmitted to the mobile station apparatus UE first (step (hereinafter referred to as "ST") 11).

The mobile station apparatus UE demodulates the MIB information from the base station apparatus eNodeB. Upon detecting the number of transmitting antennas of the base station apparatus eNodeB from the MIB information, comparison processing of comparing the number of transmitting antennas with the maximum number of supported antennas of the base station apparatus eNodeB supported by the mobile station apparatus UE is performed (ST12). As a result of the comparison processing, whichever is the smaller of the number of transmitting antennas and the maximum number of supported antennas is selected as a number of virtual antennas $N_{min}$. The selected number of virtual antennas $N_{min}$ is reported to the base station apparatus eNodeB through an RRC message (ST13).

In the comparison processing, the mobile station apparatus UE identifies the maximum number of supported antennas of the base station apparatus eNodeB supported by the mobile station apparatus UE based on the contents of, for example, UE capability indicating capability information of the mobile station apparatus UE. When identifying the number of supported antennas, the number of supported antennas may be similarly identified based on the contents of UE category indicating capability information of the mobile station apparatus UE. Thus, since the number of supported antennas is identified based on the contents of capability information stored in the mobile station apparatus UE, it is possible to select a number of virtual antennas $N_{min}$ without requiring complicated processing.

Upon receiving a report on the number of virtual antennas $N_{min}$ through an RRC message, the base station apparatus eNodeB performs setting processing required for transmission by a MIMO transmission technique using the number of virtual antennas $N_{min}$ (ST14). In this setting processing, for example, processing of selecting an RI, PMI based on a codebook in accordance with the number of virtual antennas $N_{min}$ is performed. Through this setting processing, it is possible to transmit a data channel signal using the number of virtual antennas $N_{min}$ even when the number of transmitting antennas of the base station apparatus eNodeB is different from the number of virtual antennas $N_{min}$.

Based on the setting contents in the setting processing, a data channel signal (PDSCH: Physical Downlink Shared Channel) is transmitted to the mobile station apparatus UE n accordance with the number of virtual antennas $N_{min}$ (ST15). Thus, in the data transmitting method according to the first aspect, whichever is the smaller of the number of transmitting antennas of the base station apparatus eNodeB and the maximum number of supported antennas of the base station apparatus eNodeB supported by the mobile station apparatus UE is selected as a number of virtual antennas and a data channel signal (PDSCH) is transmitted in accordance with this number of virtual antennas.

Here, the operation when the number of transmitting antennas of the base station apparatus eNodeB is 8 and the maximum number of supported antennas of the base station apparatus eNodeB supported by the mobile station apparatus UE is 4 will be described. In this case, the fact that the number of transmitting antennas of the base station apparatus eNodeB is 8 is multiplexed with the MIB information and transmitted to the mobile station apparatus UE (ST11). In the comparison processing, 8 antennas which are transmitting antennas is compared with 4 antennas which is the maximum number of supported antennas and 4 antennas is selected as a number of virtual antennas $N_{min}$ (ST12). 4 antennas is reported to the base station apparatus eNodeB as a number of virtual antennas through an RRC message (ST13). In the setting processing, setting processing is performed that is required to transmit data according to the MIMO transmission technique using 4 antennas which is the number of virtual antennas $N_{min}$ (ST14). A data channel signal (PDSCH) in accordance with the 4 antennas which is the number of virtual antennas $N_{min}$ is transmitted to the mobile station apparatus UE (ST15). For example, it is possible to perform data transmission by selecting single user MIMO that performs data transmission to the same mobile station apparatus UE using 4 antennas or multiuser MIMO that performs data transmission to a plurality of mobile station apparatuses UE.

Thus, in the data transmitting method according to the first aspect, of the number of transmitting antennas of the base station apparatus eNodeB (e.g., 8 antennas) and the maximum number of supported antennas of the base station apparatus eNodeB supported by the mobile station apparatus UE (e.g., 4 antennas), the smaller number of antennas is selected as a number of virtual antennas (e.g., 4 antennas) and the data channel signal (PDSCH) is transmitted in accordance with this number of virtual antennas $N_{min}$. Thus, it is possible to perform data transmission with the number of virtual antennas that allows the data rate to be increased most effectively between the number of transmitting antennas of the base station apparatus eNodeB and the number of supported antennas of the mobile station apparatus UE, and thereby increase the data rate to a maximum in MIMO transmission even when the number of transmitting antennas of the base station apparatus eNodeB is different from the number of supported antennas of the base station apparatus eNodeB supported by the mobile station apparatus UE.

Particularly, in the data transmitting method according to the first aspect, since the number of transmitting antennas of the base station apparatus eNodeB is multiplexed with the MIB information and transmitted, and then reported to the mobile station apparatus UE, it is possible to report the number of transmitting antennas of the base station apparatus eNodeB to the mobile station apparatus UE with high accuracy and at an early stage.

Figure 3:
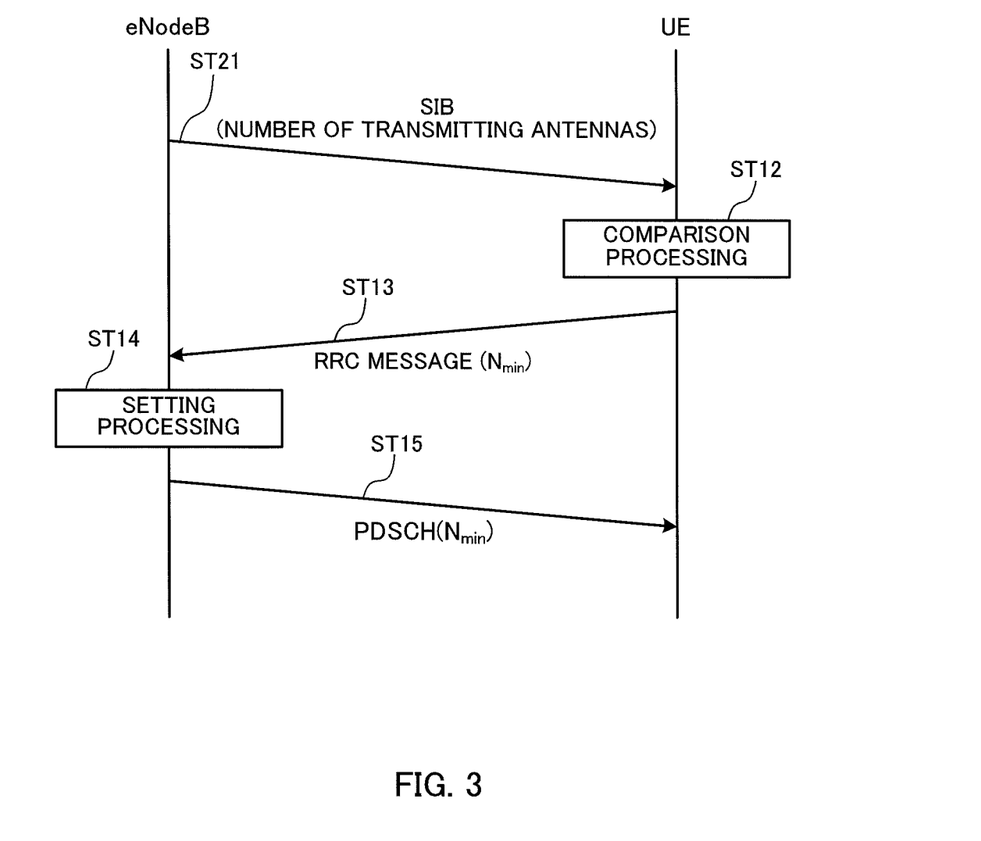
FIG. 3 is a sequence diagram illustrating a data transmitting method according to a second aspect of the present invention.

FIG. 3 is a sequence diagram illustrating a data transmitting method according to a second aspect of the present invention. In the sequence shown in FIG. 3, processes common to those in FIG. 2 are assigned the same reference numerals and descriptions thereof will be omitted.

As shown in FIG. 3, the data transmitting method according to the second aspect is different from the data transmitting method according to the first aspect in that the number of transmitting antennas of the base station apparatus eNodeB is multiplexed with SIB information and transmitted (ST21). The mobile station apparatus UE demodulates SIB information from the base station apparatus eNodeB and detects the number of transmitting antennas of the base station apparatus eNodeB contained in the SIB information. Processes from the comparison process using the detected number of transmitting antennas onward are common to those of the data transmitting method according to the first aspect.

In the data transmitting method according to the second aspect, as in the case of the data transmitting method according to the first aspect, of the number of transmitting antennas of the base station apparatus eNodeB and the maximum number of supported antennas of the base station apparatus eNodeB supported by the mobile station apparatus UE, the smaller number of antennas is selected as a number of virtual antennas $N_{min}$ and a data channel signal (PDSCH) is transmitted in accordance with this number of virtual antennas. In this way, it is possible to perform data transmission with the number of virtual antennas $N_{min}$ that allows the data rate to be increased most effectively between the number of transmitting antennas of the base station apparatus eNodeB and the number of supported antennas of the mobile station apparatus UE, and thereby increase the data rate to a maximum in MIMO transmission even when the number of transmitting antennas of the base station apparatus eNodeB is different from the number of supported antennas of the base station apparatus eNodeB supported by the mobile station apparatus UE.

Particularly, in the data transmitting method according to the second aspect, since the number of transmitting antennas of the base station apparatus eNodeB is multiplexed with the SIB information and transmitted, and then reported to the mobile station apparatus UE, it is possible to report the number of transmitting antennas of the base station apparatus eNodeB to the mobile station apparatus UE with high accuracy and at an early stage.

Figure 4:
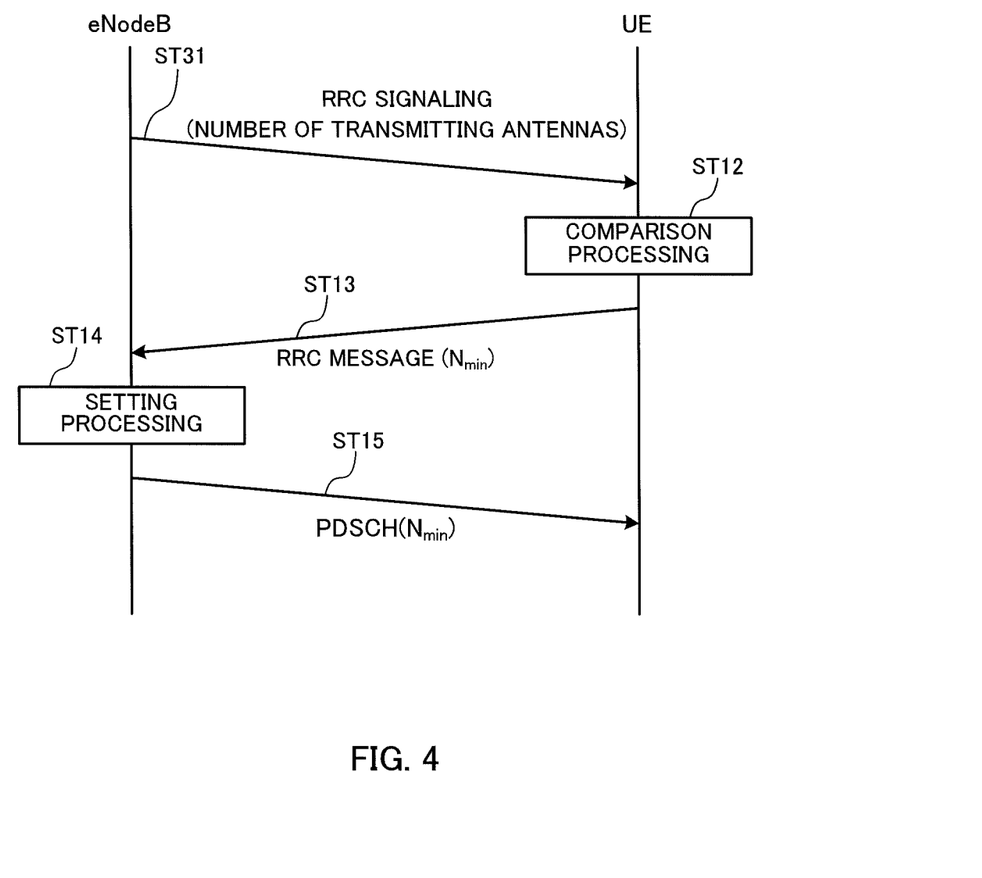
FIG. 4 is a sequence diagram illustrating a data transmitting method according to a third aspect of the present invention.

FIG. 4 is a sequence diagram illustrating a data transmitting method according to a third aspect of the present invention. In the sequence shown in FIG. 4, processes common to those in FIG. 2 are assigned the same reference numerals and descriptions thereof will be omitted.

As shown in FIG. 4, the data transmitting method according to the third aspect is different from the data transmitting method according to the first aspect in that the number of transmitting antennas of the base station apparatus eNodeB is multiplexed with RRC signaling information and transmitted (ST31). The mobile station apparatus UE demodulates the RRC signaling information from the base station apparatus eNodeB and detects the number of transmitting antennas of the base station apparatus eNodeB included in the RRC signaling information. Processes from the comparison process using the detected number of transmitting antennas onward are common to those of the data transmitting method according to the first aspect.

In the data transmitting method according to the third aspect, for example, the number of transmitting antennas of the base station apparatus eNodeB can be multiplexed with information on the number of antenna ports of CSI-RS contained in the RRC signaling information. In the LTE-A system, RRC signaling information may explicitly or implicitly contain information on the number of antenna ports of CSI-RS. Thus, by multiplexing the number of transmitting antennas of the base station apparatus eNodeB with the information on the number of antenna ports of CSI-RS contained in the RRC signaling information and then demodulating the information on the number of antenna ports of CSI-RS, it is possible to detect the actual number of transmitting antennas of the base station apparatus eNodeB.

In the data transmitting method according to the third aspect, as in the case of the data transmitting method according to the first aspect, of the number of transmitting antennas of the base station apparatus eNodeB and the maximum number of supported antennas of the base station apparatus eNodeB supported by the mobile station apparatus UE, the smaller number of antennas is selected as a number of virtual antennas $N_{min}$ and a data channel signal (PDSCH) is transmitted in accordance with this number of virtual antennas. In this way, it is possible to perform data transmission with the number of virtual antennas that allows the data rate to be increased most effectively between the number of transmitting antennas of the base station apparatus eNodeB and the number of supported antennas of the mobile station apparatus UE, and thereby increase the data rate to a maximum in MIMO transmission even when the number of transmitting antennas of the base station apparatus eNodeB is different from the number of supported antennas of the base station apparatus eNodeB supported by the mobile station apparatus UE.

Particularly, in the data transmitting method according to the third aspect, since the number of transmitting antennas of the base station apparatus eNodeB is multiplexed with the RRC signaling information and transmitted, and then reported to the mobile station apparatus UE, it is possible to report the number of transmitting antennas of the base station apparatus eNodeB to the mobile station apparatus UE without constraints of the amount of information or the like and flexibly, compared with the case where the number of transmitting antennas is multiplexed with the MIB information or SIB information.

In the above-described data transmitting methods according to the first to third aspects, the number of transmitting antennas used for data transmission is not confirmed until a data channel signal (PDSCH) is transmitted in accordance with the number of virtual antennas $N_{min}$ from the base station apparatus eNodeB. For this reason, in the data transmitting methods according to the first to third aspects, a data channel signal is transmitted using transmission diversity using a common pilot channel signal (that is, the same transmission diversity as the transmission diversity used in PBCH) until the data channel signal (PDSCH) is transmitted in accordance with the number of virtual antennas $N_{min}$ from the base station apparatus eNodeB. Thus, it is possible to perform data transmission stably even in a state in which the number of transmitting antennas used for data transmission is not confirmed and reliably share the number of virtual antennas $N_{min}$ between the base station apparatus eNodeB and the mobile station apparatus UE.

Hereinafter, an embodiment of the present invention will be described in detail with reference to the accompanying drawings. Here, a case will be described where a base station apparatus and a mobile station apparatus supporting an LTE-A system are used.

Figure 5:
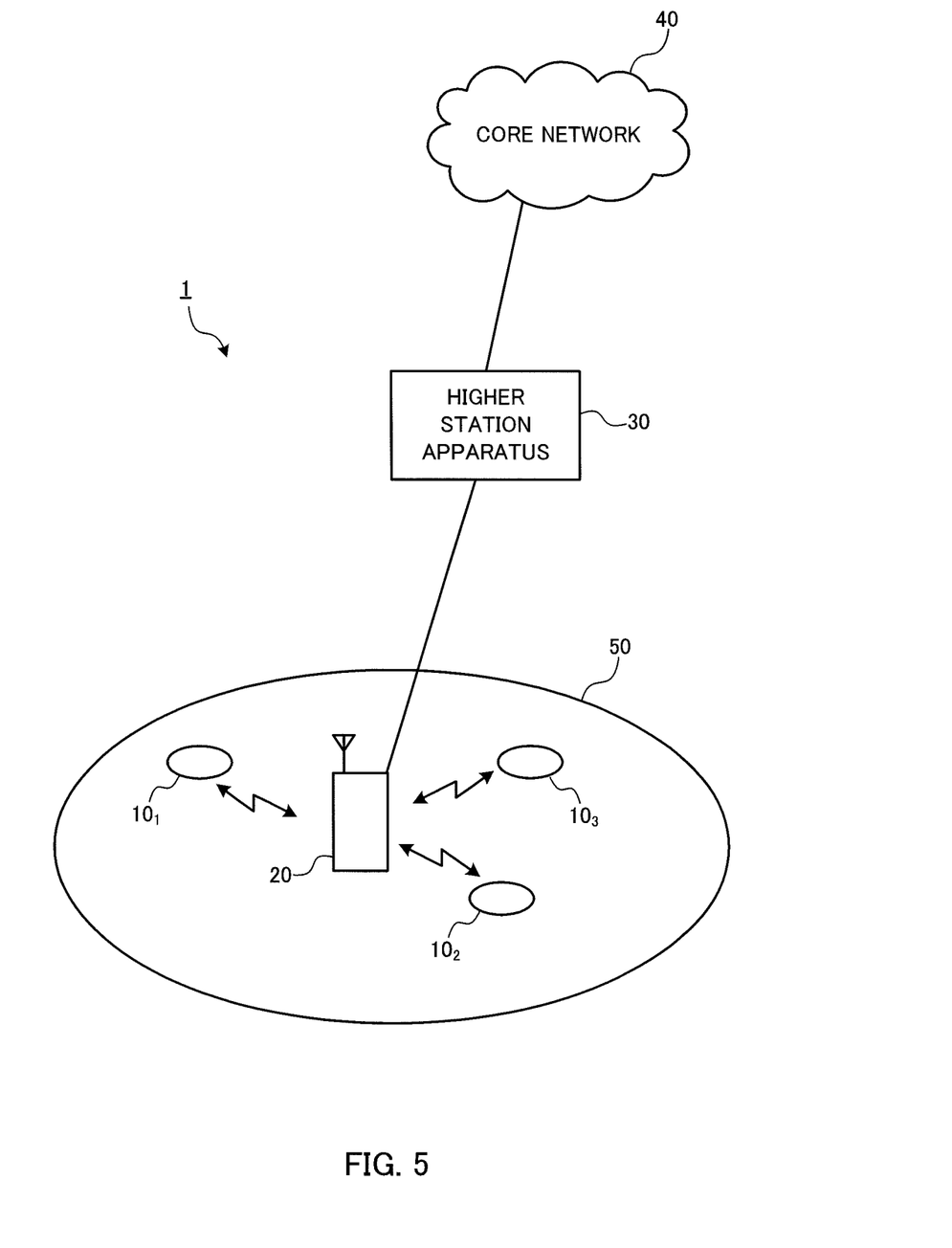
FIG. 5 is a diagram illustrating a configuration of a mobile communication system according to an embodiment of the present invention.

With reference to FIG. 5, a mobile communication system 1 including a mobile station apparatus (UE) 10 and a base station apparatus (eNodeB) 20 according to an embodiment of the present invention will be described. FIG. 5 is a diagram illustrating a configuration of the mobile communication system 1 including a mobile station apparatus 10 and a base station apparatus 20 according to an embodiment of the present invention. The mobile communication system 1 shown in FIG. 5 is a system including, for example, an LTE system or SUPER 3G. Furthermore, this mobile communication system 1 may be called "IMT-Advanced" or may also be called "4G."

As shown in FIG. 5, the mobile communication system 1 is configured by including the base station apparatus 20, and a plurality of mobile station apparatuses 10 ($10_1$, $10_2$, $10_3$, . . . $10_n$, n is an integer n>0) that communicate with the base station apparatus 20. The base station apparatus 20 is connected to a higher station apparatus 30 and this higher station apparatus 30 is connected to a core network 40. The mobile station apparatus 10 is communicating with the base station apparatus 20 in a cell 50. The higher station apparatus 30 includes, for example, an access gateway apparatus, a radio network controller (RNC), a mobility management entity (MME) or the like, but the higher station apparatus 30 is not limited to this.

Since the respective mobile station apparatuses ($10_1$, $10_2$, $10_3$, . . . $10_n$) have the same configuration, function and state, these mobile station apparatuses will be described as the mobile station apparatus 10 unless specified otherwise. For convenience of description, the mobile station apparatus 10 will be described as wirelessly communicating with the base station apparatus 20, but more generally, the mobile station apparatus 10 may be a user apparatus (UE: User Equipment) including a fixed terminal apparatus as well as a mobile terminal apparatus.

The mobile communication system 1 applies OFDMA (orthogonal frequency division multiple access) for a downlink and SC-FDMA (single carrier frequency division multiple access) for an uplink as a radio access scheme. OFDMA is a multicarrier transmission scheme that divides a frequency band into a plurality of narrow frequency bands (subcarriers) and maps data to each subcarrier to perform communication. SC-FDMA is a single carrier transmission scheme that divides the system band into bands made up of one or consecutive resource blocks per terminal so that a plurality of terminals use different bands and thereby reduce interference among terminals.

Here, a communication channel in an LTE system will be described. For a downlink, PDSCH shared among the mobile station apparatuses 10, downlink L1/L2 control channel (PDCCH (Physical Downlink Control Channel), PCFICH (Physical Control Format Indicator Channel) and PHICH (Physical Hybrid-ARQ Indicator Channel)) are used. User data, that is, a normal data signal is transmitted through this PDSCH. Transmission-data is included in this user data. CC and scheduling information assigned to the mobile station apparatus 10 by the base station apparatus 20 are reported to the mobile station apparatus 10 through the L1/L2 control channel.

For an uplink, PUSCH (Physical Uplink Shared Channel) shared among the mobile station apparatuses 10 and PUCCH (Physical Uplink Control Channel) which is an uplink control channel are used. User data is transmitted through this PUSCH. Furthermore, downlink radio quality information (CQI) or the like is transmitted through PUCCH.

Figure 6:
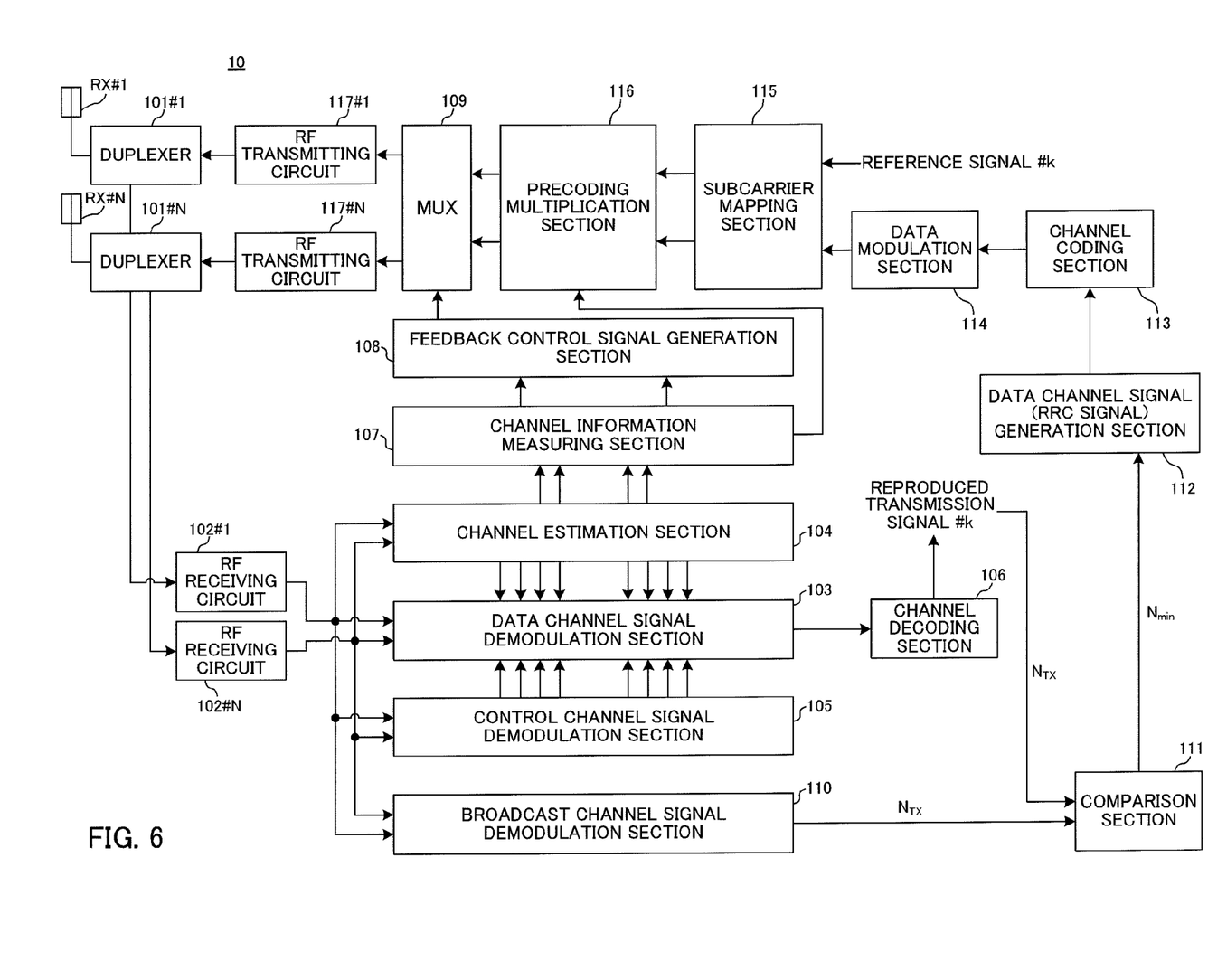
FIG. 6 is a block diagram illustrating a configuration of a mobile station apparatus according to the above embodiment.
Figure 7:
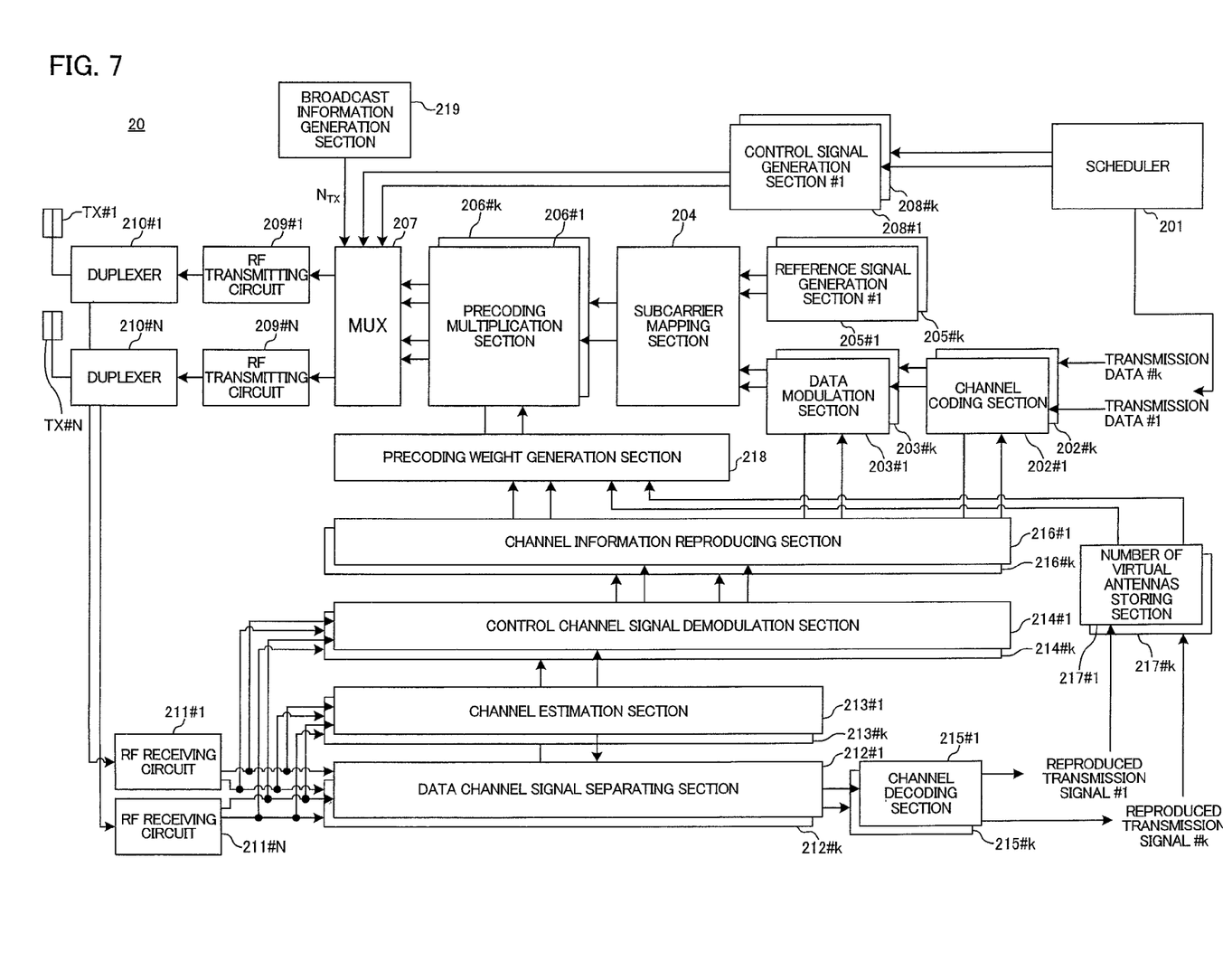
FIG. 7 is a block diagram illustrating a configuration of a base station apparatus according to the above embodiment.

FIG. 6 is a block diagram illustrating a configuration of the mobile station apparatus 10 according to the present embodiment. FIG. 7 is a block diagram illustrating a configuration of the base station apparatus 20 according to the present embodiment. The configurations of the mobile station apparatus 10 and the base station apparatus 20 shown in FIG. 6 and FIG. 7 are simplified to describe the present invention, and suppose both apparatuses are provided with configurations of an ordinary base station apparatus and mobile station apparatus.

In the mobile station apparatus 10 shown in FIG. 6, a transmission signal transmitted from the base station apparatus 20 is received by antennas RX#1 to RX#N and electrically separated by duplexers 101#1 to 101#N into a transmission path and a reception path, and then outputted to RF receiving circuits 102#1 to 102#N. The signals are subjected to frequency conversion processing of converting radio frequency signals to baseband signals in the RF receiving circuits 102#1 to 102#N, then Fourier-transformed in a fast Fourier transform section (FFT section) (not shown), whereby the signals are transformed from time-sequential signals into frequency-domain signals. The received signals transformed into the frequency-domain signals are outputted to a data channel signal demodulation section 103.

The data channel signal demodulation section 103 separates the received signal from the FFT section using, for example, a maximum likelihood detection (MLD) signal separating method. This causes the received signal arriving from the base station apparatus 20 to be separated into received signals relating to user #1 to user #k, and received signals relating to users of the mobile station apparatus 10 (here, suppose user k) are extracted. A channel estimation section 104 estimates a channel condition from a reference signal included in the received signal outputted from the FFT section and reports the estimated channel condition to the data channel signal demodulation section 103 and a channel information measuring section 107 which will be described later. The data channel signal demodulation section 103 separates the received signal based on the reported channel condition using the above-described MLD signal separating method.

A control channel signal demodulation section 105 demodulates a control channel signal (PDCCH) outputted from the FFT section. The control channel signal demodulation section 105 then reports control information included in the control channel signal to the data channel signal demodulation section 103. The data channel signal demodulation section 103 demodulates an extracted received signal relating to the user k based on the report contents from the control channel signal demodulation section 105. Prior to the demodulation processing by the data channel signal demodulation section 103, suppose the extracted received signal relating to the user k is demapped by a subcarrier demapping section (not shown) and converted back to a time-sequential signal. The received signal relating to the user k demodulated in the data channel signal demodulation section 103 is outputted to a channel decoding section 106. The channel decoding section 106 then applies channel decoding processing to the received signal and a transmission signal #k is thereby reproduced.

For example, as in the case of the data transmitting methods according to the above-described second and third aspects, when the number of transmitting antennas $N_{TX}$ of the base station apparatus 20 is multiplexed with SIB information and RRC signaling information, the number of transmitting antennas $N_{TX}$ of the base station apparatus 20 is included in the reproduced transmission signal #k. For this reason, when the data transmitting methods according to the second and third aspects are applied, the number of transmitting antennas $N_{TX}$ of the base station apparatus 20 is outputted from, for example, the channel decoding section 106 to a comparison section 111 which will be described later. The reception system including the control channel signal demodulation section 105 constitutes receiving section configured to receive the number of transmitting antennas $N_{TX}$ of the base station apparatus 20.

The channel information measuring section 107 measures channel information from the channel condition reported from the channel estimation section 104. To be more specific, the channel information measuring section 107 measures a CQI based on the channel condition reported from the channel estimation section 104, selects a PMI and an RI corresponding thereto and reports the CQI, PMI and RI to a feedback control signal generation section 108.

The feedback control signal generation section 108 generates a control signal (e.g., PUCCH) that feeds back the reported PMI, CQI and RI to the base station apparatus 20 based thereon. The control signal generated in the feedback control signal generation section 108 is outputted to a multiplexer (MUX) 109.

A broadcast channel signal demodulation section 110 demodulates a broadcast channel signal (PBCH) outputted from the FFT section. For example, as the above-described data transmitting method according to the first aspect, when the number of transmitting antennas $N_{TX}$ of the base station apparatus 20 is multiplexed with the MIB information, the number of transmitting antennas $N_{TX}$ of the base station apparatus 20 is included in a broadcast channel signal. For this reason, when the data transmitting method according to the first aspect is applied, the number of transmitting antennas $N_{TX}$ of the base station apparatus 20 is outputted from the broadcast channel signal demodulation section 110 to the comparison section 111 which will be described later. Broadcast information other than the number of transmitting antennas $N_{TX}$ of the base station apparatus 20 is outputted to a higher layer (not shown). The reception system including the broadcast channel signal demodulation section 110 constitutes receiving section configured to receive the number of transmitting antennas $N_{TX}$ of the base station apparatus 20.

The comparison section 111 constitutes selecting section and compares the number of transmitting antennas $N_{TX}$ of the base station apparatus 20 reported from the channel decoding section 106 (data transmitting method according the second to third aspects) or the broadcast channel signal demodulation section 110 (data transmitting method according to the first aspect) with the maximum number of supported antennas of the base station apparatus 20 supported by the mobile station apparatus 10. The number of supported antennas of the base station apparatus 20 supported by the mobile station apparatus 10 is identified by UE capability or UE category indicating capability information of the mobile station apparatus UE. Of the number of transmitting antennas $N_{TX}$ and the maximum number of supported antennas, the smaller number of antennas is selected as a number of virtual antennas $N_{min}$. The selected number of virtual antennas $N_{min}$ is outputted to a data channel signal generation section 112.

On the other hand, the transmission data #k relating to the user #k transmitted from a higher layer is outputted to the data channel signal generation section 112. The data channel signal generation section 112 generates an RRC control signal (RRC message) including the number of virtual antennas $N_{min}$ outputted from the comparison section 111. The data channel signal generation section 112 then generates a data channel signal #k including this RRC control signal and the transmission data #k and outputs the data channel signal #k to a channel coding section 113.

The data channel signal #k from the data channel signal generation section 112 is channel-coded by the channel coding section 113 and then data-modulated by a data modulation section 114. The data channel signal #k subjected to the data modulation in the data modulation section 114 is subjected to inverse Fourier transform in a discrete Fourier transform section (not shown), transformed from a time-sequential signal into a frequency-domain signal and outputted to a subcarrier mapping section 115.

The subcarrier mapping section 115 maps the data channel signal #k to subcarriers in accordance with schedule information specified from the base station apparatus 20. In this case, the subcarrier mapping section 115 maps (multiplexes) a reference signal #k generated by a reference signal generation section (not shown) to subcarriers together with the data channel signal #k. The data channel signal #k mapped to subcarriers is outputted to a precoding multiplication section 116.

The precoding multiplication section 116 performs phase and/or amplitude shift on the transmission data #k for each of the receiving antennas RX#1 to RX#N based on a precoding weight corresponding to a PMI selected by the channel information measuring section 107. The data channel signal #k phase and/or amplitude-shifted in the precoding multiplication section 116 is outputted to the multiplexer (MUX) 109.

The multiplexer (MUX) 109 multiplexes the phase and/or amplitude-shifted data channel signal #k with a control signal generated by the feedback control signal generation section 108 to generate a transmission signal for each of the receiving antennas RX#1 to RX#N. The transmission signal generated by the multiplexer (MUX) 109 is subjected to inverse fast Fourier transform in an inverse fast Fourier transform section (not shown), transformed from a frequency-domain signal to a time-domain signal and then outputted to RF transmitting circuits 117#1 to 117#N. The signal is subjected to frequency conversion processing of converting the signal to a radio frequency band in RF transmitting circuits 117#1 to 117#N and then outputted to the antennas RX#1 to RX#N via the duplexers 101#1 to 101#N and transmitted from the receiving antennas RX#1 to RX#N to the base station apparatus 20 over an uplink. The transmission system including the data channel signal generation section 112 constitutes antenna information transmitting section configured to transmit the number of virtual antennas to the base station apparatus 20.

Thus, the mobile station apparatus 10 according to the present embodiment selects whichever is the smaller of the number of transmitting antennas $N_{TX}$ of the base station apparatus 20 and the maximum number of supported antennas of the base station apparatus 20 supported by the mobile station apparatus 10 as a number of virtual antennas $N_{min}$ and transmits this number of virtual antennas $N_{min}$ to the base station apparatus 20 using an RRC control signal (RRC message), and can thereby report the number of virtual antennas $N_{min}$ that allows the data rate to be increased most effectively between the number of transmitting antennas $N_{TX}$ of the base station apparatus 20 and the number of supported antennas of the mobile station apparatus 10 to the base station apparatus. Accordingly, the base station apparatus transmits a data channel signal in accordance with this number of virtual antennas $N_{min}$ and can thereby perform data transmission with the number of virtual antennas $N_{min}$ that allows the data rate to be increased most effectively between the number of transmitting antennas $N_{TX}$ of the base station apparatus 20 and the number of supported antennas of the mobile station apparatus 10, and thereby increase the data rate to a maximum in MIMO transmission even when the number of transmitting antennas $N_{TX}$ of the base station apparatus 20 is different from the number of supported antennas of the base station apparatus 20 supported by the mobile station apparatus 10.

On the other hand, in the base station apparatus 20 shown in FIG. 7, a scheduler 201 determines the number of multiplexed users based on a channel estimate value given from channel estimation-sections 213#1 to 213#k which will be described later. The scheduler 201 then determines resource allocation contents (scheduling information) of an uplink and downlink for each user and transmits transmission data #1 to #k corresponding to users #1 to #k to corresponding channel coding sections 202#1 to 202#k.

In this case, in the data transmitting methods according to the above-described second and third aspects, transmission data #1 to #k containing the SIB information or RRC signaling information multiplexed with the number of transmitting antennas $N_{TX}$ provided for the base station apparatus 20 are generated. The transmission data #1 to #k are transmitted to the corresponding channel coding sections 202#1 to 202#k. The transmission system including a transmission data generation section (not shown) that generates the transmission data #1 to #k containing the SIB information or the RRC signaling information constitutes antenna information transmitting section configured to transmit the number of transmitting antennas $N_{TX}$ to the mobile station apparatus 10.

The transmission data #1 to #k are channel-coded in channel coding sections 202#1 to 202#k and then outputted to data modulation sections 203#1 to 203#k and subjected to data modulation. In this case, the channel coding and data modulation are performed based on a channel coding rate and a modulation scheme-given from channel information reproducing sections 216#1 to 216#k which will be described later. The transmission data #1 to #k subjected to data modulation in the data modulation sections 203#1 to 203#k are subjected to inverse Fourier transform in a discrete Fourier transform section (not shown), transformed from time-sequential signals to frequency-domain signals and outputted to a subcarrier mapping section 204.

Reference signal generation sections 205#1 to 205#k generate specific reference signals (UE specific RS) #1 to #k for data channel demodulation for user #1 to user #k. The UE specific RSs #1 to #k generated by the reference signal generation sections 205#1 to 205#k are outputted to the subcarrier mapping section 204.

The subcarrier mapping section 204 maps the transmission data #1 to #k from the data modulation sections 203#1 to 203#k and the UE specific RSs #1 to #k from the reference signal generation sections 205#1 to 205#k to subcarriers in accordance with schedule information given from the scheduler 201. The transmission data #1 to #k mapped to subcarriers are outputted to precoding multiplication sections 206#1 to 206#k.

The precoding multiplication sections 206#1 to 206#k perform phase and/or amplitude shift on the transmission data #1 to #k for each of antennas TX#1 to TX#N based on a precoding weight given from a precoding weight generation section 218 which will be described later (weighting of antenna TX#1 to #N through precoding). The transmission data #1 to #k phase and/or amplitude-shifted in the precoding multiplication sections 206#1 to 206#k are outputted to a multiplexer (MUX) 207.

Control signal generation sections 208#1 to 208#k generate control signals (PDCCH) #1 to #k based on the number of multiplexed users from the scheduler 201. PDCCH#1 to #k generated by the control signal generation sections 208#1 to 208#k are outputted to the multiplexer (MUX) 207.

A broadcast information generation section 219 generates broadcast information (broadcast channel signal) to be broadcast to the mobile station apparatus 10. The broadcast information generated in the broadcast information generation section 219 is outputted to the multiplexer (MUX) 207. For example, the above-described data transmitting method according to the first aspect generates broadcast information (broadcast channel signal) containing MIB information multiplexed with the number of transmitting antennas $N_{TX}$ provided for the base station apparatus 20. The transmission system including the broadcast information generation section 219 constitutes antenna information transmitting section configured to transmit the number of transmitting antennas $N_{TX}$ to the mobile station apparatus 10.

The multiplexer (MUX) 207 multiplexes the phase and/or amplitude-shifted transmission data #1 to #k with each PDCCH#1 to #k generated in the control signal generation sections 208#1 to 208#k to generate transmission signals for each of the transmitting antennas TX#1 to TX#N. The transmission signals generated in the multiplexer (MUX) 207 are subjected to inverse fast Fourier transform in an inverse fast Fourier transform section (not shown), transformed from a frequency-domain signal to a time-domain signal and then outputted to RF transmitting circuits 209#1 to 209#N. The time-domain signal is then subjected to frequency conversion processing of transforming the signal into a radio frequency band in RF transmitting circuits 210#1 to 210#N, then outputted to the transmitting antennas TX#1 to TX#N via duplexers 210#1 to 210#N and transmitted from the antennas TX#1 to #N to the mobile station apparatus 10 over a downlink. The transmission system including the RF transmitting circuit 209, duplexer 210 and transmitting antenna TX constitutes data transmitting section configured to transmit a data channel signal to the mobile station apparatus 10.

On the other hand, a transmission signal transmitted from the mobile station apparatus 10 over an uplink is received by the antennas TX#1 to #N, electrically separated into a transmission path and a reception path in the duplexers 210#1 to 210#N and outputted to RF receiving circuits 211#1 to 211#N. The received signals are then subjected to frequency conversion processing whereby the signals are converted from radio frequency signals to baseband signals in the RF receiving circuits 211#1 to 211#N, and subjected to Fourier transform in a fast Fourier transform section (FFT section) (not shown), whereby the signals are transformed from time-sequential signals to frequency-domain signals. The received signals transformed into frequency-domain signals are outputted to data channel signal separating sections 212#1 to 212#k.

The data channel signal separating sections 212#1 to 212#k separate the received signals inputted from the FFT section using, for example, a maximum likelihood detection (MLD) signal separating method. This causes the received signals arriving from the mobile station apparatus 10 to be separated into received signals relating to the user #1 to user #k. Channel estimation sections 213#1 to 213#k estimate a channel condition from a reference signal included in the received signals outputted from the FFT section and report the estimated channel condition to the data channel signal separating sections 212#1 to 212#k and control channel signal demodulation sections 214#1 to 214#k. The data channel signal separating sections 212#1 to 212#k separate the received signals based on the reported channel condition using the above-described MLD signal separating method.

The received signals relating to the user #1 to user #k separated by the data channel signal separating sections 212#1 to 212#k are demapped by a subcarrier demapping section (not shown), converted back to time-sequential signals, and then subjected to data demodulation in a data demodulation section (not shown). The received signals are then subjected to channel decoding processing in channel decoding sections 215#1 to 215#k and transmission signals #1 to #k are thereby reproduced. The reproduced transmission signals #1 to #k include number of virtual antennas $N_{min}$ in an RRC message. These number of virtual antennas $N_{min}$ are outputted from, for example, the channel decoding sections 215#1 to 215#k to number of virtual antennas storing sections 217#1 to 217#k which will be described later. The reception system including the data channel signal separating sections 212 that separate transmission signals #1 to #k containing an RRC message constitutes receiving section configured to receive the number of virtual antennas $N_{min}$ from the mobile station apparatus 10.

The control channel signal demodulation sections 214#1 to 214#k demodulate a control channel signal (e.g., PDCCH) included in the received signal inputted from the FFT section. In this case, the control channel signal demodulation sections 214#1 to 214#k demodulate control channel signals corresponding to the user #1 to user #k respectively. In this case, the control channel signal demodulation sections 214#1 to 214#k demodulate the control channel signals based on the channel conditions reported from the channel estimation sections 213#1 to 213#k. The respective control channel signals demodulated by the control channel signal demodulation sections 214#1 to 214#k are outputted to the channel information reproducing sections 216#1 to 216#k.

The channel information reproducing sections 216#1 to 216#k reproduce channel-related information (channel information) from information contained in each control channel signal (e.g., PUCCH) inputted from the control channel signal demodulation sections 214#1 to 214#k. The channel information contains feedback information such as a CQI, PMI or RI reported through PDCCH. CQIs reproduced in the channel information reproducing sections 216#1 to 216#k are outputted to the data modulation sections 203#1 to 203#k and the channel coding sections 202#1 to 202#k respectively. The PMIs and RIs reproduced in the channel information reproducing sections 216#1 to 216#k are outputted to the precoding weight generation section 218.

Number of virtual antennas storing sections 217#1 to 217#k store the number of virtual antennas $N_{min}$ reported from the channel decoding sections 215#1 to 215#k. The number of virtual antennas storing sections 217#1 to 217#k store the number of virtual antennas $N_{min}$ applied to the mobile station apparatuses 10#1 to 10#k respectively. The number of virtual antennas $N_{min}$ stored in the number of virtual antennas storing sections 217#1 to 217#k are outputted to the precoding weight generation section 218 as appropriate.

The precoding weight generation section 218 generates precoding weights indicating the amounts of phase and/or amplitude shift corresponding to the transmission data #1 to #k based on the PMIs and RIs inputted from the channel information reproducing sections 216#1 to 216#k and the number of virtual antennas $N_{min}$ inputted from the number of virtual antennas storing sections 217#1 to 217#k. The respective precoding weights generated are and used for precoding the transmission data #1 to transmission data #k.

Thus, precoding weights are generated based on the number of virtual antennas $N_{min}$ inputted from the number of virtual antennas storing sections 217#1 to 217#k and precoding weights appropriate to the number of virtual antennas $N_{min}$ are thereby generated instead of the number of transmitting antennas $N_{TX}$ provided for the base station apparatus 20. For example, when the number of transmitting antennas $N_{TX}$ provided for the base station apparatus 20 is 8, if the number of virtual antennas $N_{min}$ for the mobile station apparatus 10 as a communication target is 4, it is possible to perform data transmission by virtually assuming 8 antennas as 4 antennas (to be more specific, virtually assuming 2 antennas as 1 antenna).

Thus, the base station apparatus 20 according to the present embodiment transmits data channel signals in accordance with the number of virtual antennas $N_{min}$ made up of whichever is the smaller of the number of transmitting antennas $N_{TX}$ of the base station apparatus 20 and the maximum number of supported antennas of the base station apparatus 20 supported by the mobile station apparatus 10. Thus, it is possible to perform data transmission with the number of virtual antennas $N_{min}$ that allows the data rate to be increased most effectively between the number of transmitting antennas $N_{TX}$ of the base station apparatus 20 and the number of supported antennas of the mobile station apparatus 10, and thereby increase the data rate to a maximum in MIMO transmission even when the number of transmitting antennas $N_{TX}$ of the base station apparatus 20 is different from the number of antennas of the base station apparatus 20 supported by the mobile station apparatus 10.

As described above, the data transmitting method according to the present embodiment selects whichever is the smaller of the number of transmitting antennas $N_{TX}$ of the base station apparatus 20 and the maximum number of supported antennas of the base station apparatus 20 supported by the mobile station apparatus 10 as a number of virtual antennas $N_{min}$ and transmits data channel signals in accordance with this number of virtual antennas $N_{min}$. Thus, it is possible to perform data transmission with the number of virtual antennas $N_{min}$ that allows the data rate to be increased most effectively between the number of transmitting antennas $N_{TX}$ of the base station apparatus 20 and the number of supported antennas of the mobile station apparatus 10, and thereby increase the data rate to a maximum in MIMO transmission even when the number of transmitting antennas $N_{TX}$ of the base station apparatus 20 is different from the number of supported antennas of the base station apparatus 20 supported by the mobile station apparatus 10.

Furthermore, the data transmitting method according to the present embodiment reports the number of transmitting antennas $N_{TX}$ of the base station apparatus 20 and selects the number of virtual antennas $N_{min}$ based on the number of transmitting antennas $N_{TX}$, and can thereby avoid such a situation in which it is not possible to appropriately comprehend the number of transmitting antennas $N_{TX}$ of the base station apparatus 20, making subsequent data communication impossible.

The present invention has been described in detail using the above-described embodiments, but it is obvious to those skilled in the art that the present invention is not limited to the embodiments described in the present DESCRIPTION. The present invention can be implemented as modified or altered embodiments without departing from the spirit and scope of the present invention defined in the description of the scope of patent claims. Therefore, the description of the present DESCRIPTION is intended to be illustrative and by no means intended to limit the present invention.

The present application is based on Japanese Patent Application No. 2010-105399 filed on Apr. 30, 2010, entire content of which is expressly incorporated by reference herein.

The invention claimed is:

1. A data transmitting method comprising:
a step of reporting the number of transmitting antennas of a base station apparatus to a mobile station apparatus;
a step of the mobile station apparatus comparing the number of transmitting antennas with a maximum number of supported antennas of the base station apparatus supported by the mobile station apparatus and selecting the smaller number of antennas as a number of virtual antennas;

a step of reporting the number of virtual antennas to the base station apparatus; and a step of transmitting a data channel signal from the base station apparatus in accordance with the number of virtual antennas.

2. The data transmitting method according to claim 1, wherein the number of transmitting antennas is multiplexed with MIB (Master Information Block) information and transmitted to the mobile station apparatus and the number of virtual antennas is reported to the base station apparatus using an RRC message.

3. The data transmitting method according to claim 1, wherein the number of transmitting antennas is multiplexed with SIB (System Information Block) information and transmitted to the mobile station apparatus and the number of virtual antennas is reported to the base station apparatus using an RRC message.

4. The data transmitting method according to claim 1, wherein the number of transmitting antennas is multiplexed with RRC signaling information and transmitted to the mobile station apparatus, and the number of virtual antennas is reported to the base station apparatus using an RRC message.

5. The data transmitting method according to claim 4, wherein the number of transmitting antennas is multiplexed with information on the number of antenna ports of CSI-RS contained in the RRC signaling information and transmitted to the mobile station apparatus.

6. The data transmitting method according to claim 1, wherein the number of transmitting antennas is compared with the number of supported antennas contained in capability information stored in the mobile station apparatus and the number of virtual antennas is selected.

7. The data transmitting method according to claim 1, wherein a data channel signal is transmitted using transmission diversity using a common pilot channel signal until the base station apparatus transmits the data channel signal in accordance with the number of virtual antennas.

8. The data transmitting method according to claim 1, wherein the number of transmitting antennas is 8.

9. A base station apparatus comprising:

antenna information transmitting section configured to transmit the number of transmitting antennas provided for the base station apparatus to a mobile station apparatus;

receiving section configured to receive, from the mobile station apparatus, a number of virtual antennas made up of whichever is the smaller of the number of transmitting antennas and a maximum number of supported antennas of the base station apparatus supported by the mobile station apparatus; and data transmitting section configured to transmit a data channel signal to the mobile station apparatus in accordance with the number of virtual antennas.

10. A mobile station apparatus comprising:

receiving section configured to receive a number of transmitting antennas of a base station apparatus;

selecting section configured to compare the number of transmitting antennas with a maximum number of supported antennas of the base station apparatus supported by the mobile station apparatus and select the smaller number of antennas as a number of virtual antennas; and antenna information transmitting section configured to transmit the number of virtual antennas to the base station apparatus.

* * * * *